United States Patent
Sohacki et al.

(10) Patent No.: US 12,208,868 B2
(45) Date of Patent: *Jan. 28, 2025

(54) GYROSCOPIC BOAT STABILIZER WITH MOTOR COOLING

(71) Applicant: WaveTamer LLC, Greenville, NC (US)

(72) Inventors: Brian John Sohacki, Livonia, MI (US); Aaron Powers, Canton, MI (US); Grady Smith, Greenville, NC (US)

(73) Assignee: WAVETAMER LLC, Greenville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,308

(22) Filed: Sep. 29, 2023

(65) Prior Publication Data
US 2024/0025518 A1 Jan. 25, 2024

Related U.S. Application Data

(63) Continuation of application No. 18/020,229, filed as application No. PCT/US2021/046661 on Aug. 19, 2021, now Pat. No. 11,780,541.
(Continued)

(51) Int. Cl.
*B63B 39/04* (2006.01)
*F16C 19/18* (2006.01)
(Continued)

(52) U.S. Cl.
CPC .............. *B63B 39/04* (2013.01); *F16C 19/18* (2013.01); *F16C 37/007* (2013.01); *H02K 5/203* (2021.01);
(Continued)

(58) Field of Classification Search
CPC ........ B63B 39/00; B63B 39/04; H02K 5/203; H02K 7/02; H02K 9/193; F16C 19/18; F16C 37/007
(Continued)

(56) References Cited

U.S. PATENT DOCUMENTS 8,117,930 B2 2/2012 Adams et al.
11,427,289 B2 8/2022 Smith et al.
(Continued)

FOREIGN PATENT DOCUMENTS

CN 110131319 A 8/2019
WO 2019224322 A1 11/2019

*Primary Examiner* — Lars A Olson
(74) *Attorney, Agent, or Firm* — COATS & BENNETT, PLLC

(57) ABSTRACT

A gyroscopic roll stabilizer for a boat includes an enclosure mounted to a gimbal for rotation about a gimbal axis and configured to maintain a below-ambient pressure, and a flywheel assembly including a flywheel and flywheel shaft, with the flywheel assembly rotatably mounted inside the enclosure for rotation about a flywheel axis. The gyroscopic roll stabilizer also includes a motor operative to rotate the flywheel assembly and disposed inside the enclosure. A motor cooling circuit is configured to transfer heat away from the motor. The motor cooling circuit has a closed fluid pathway for recirculating cooling fluid therein. The fluid pathway includes a fluid channel jointly defined by the motor and the enclosure and having the cooling fluid therein. The gyroscopic roll stabilizer is configured to transfer heat away from the motor to the cooling fluid. Related methods are also disclosed.

18 Claims, 12 Drawing Sheets

Related U.S. Application Data

(60) Provisional application No. 63/070,494, filed on Aug. 26, 2020.

(51) Int. Cl.
  *F16C 37/00* (2006.01)
  *H02K 5/20* (2006.01)
  *H02K 7/02* (2006.01)
  *H02K 9/193* (2006.01)

(52) U.S. Cl.
  CPC ............... *H02K 7/02* (2013.01); *H02K 9/193* (2013.01); *F16C 2361/55* (2013.01)

(58) Field of Classification Search
  USPC ......................................................... 114/122
  See application file for complete search history.

(56) References Cited

U.S. PATENT DOCUMENTS

| | | | |
|---|---|---|---|
| 11,591,052 B2 | 2/2023 | Sohacki et al. | |
| 11,780,541 B2 * | 10/2023 | Sohacki | B63B 34/05 |
| | | | 114/122 |
| 2005/0040776 A1 | 2/2005 | Sibley | |
| 2018/0051988 A1 | 2/2018 | Miocevich et al. | |
| 2019/0367137 A1 | 12/2019 | Smith et al. | |

* cited by examiner

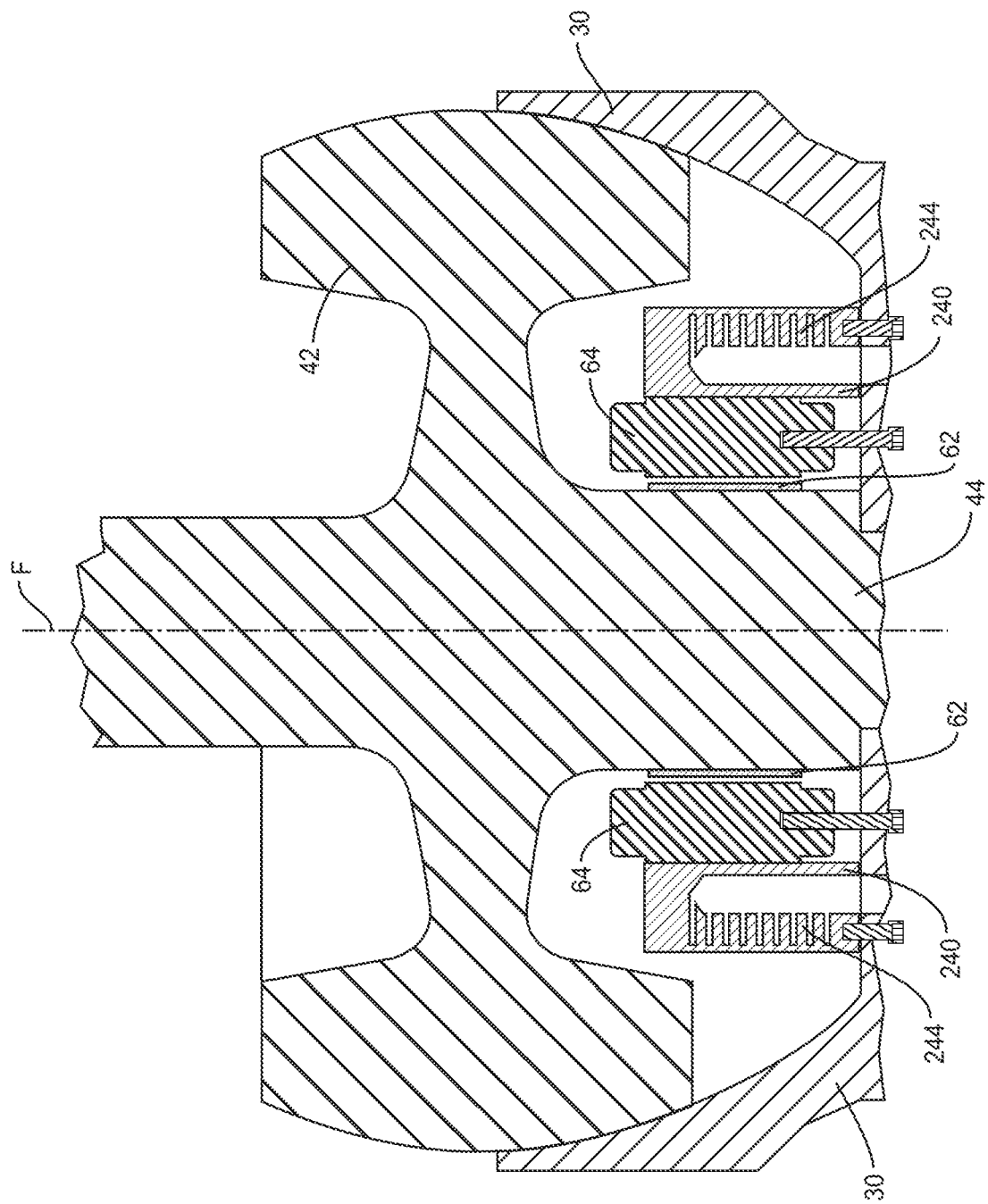

GYROSCOPIC BOAT STABILIZER WITH MOTOR COOLING

RELATED APPLICATIONS

This application is a continuation of U.S. application Ser. No. 18/020,229, filed 7 Feb. 2023, which is National Stage of International Application No. PCT/US2021/046661, filed 19 Aug. 2021, and claims the benefit of U.S. Provisional Application No. 63/070,494, filed 26 Aug. 2020, the disclosures of all of which are incorporated by reference herein in their entirety.

TECHNICAL FIELD

The present disclosure relates generally to boat roll stabilizers for reducing the sideways rolling motion of a boat and, more particularly, to controlled moment gyroscopes for reducing the roll of a boat based on the gyroscopic effect.

BACKGROUND

The sideways rolling motion of a boat can create safety problems for passengers and crew on boats, as well as cause discomfort to passengers not accustomed to the rolling motion of the boat. A number of technologies currently exist to reduce the sideways rolling motion of a boat. One technology currently in use is active fin stabilization. Stabilizer fins are attached to the hull of the boat beneath the waterline and generate lift to reduce the roll of the boat due to wind or waves. In the case of active fin stabilization, the motion of the boat is sensed and the angle of the fin is controlled based on the motion of the boat to generate a force to counteract the roll. Fin stabilization is most commonly used on large boats and is effective when the boat is underway. Fin stabilization technology is not used frequently in smaller boats and is generally not effective when the boat is at rest. Stabilizer fins also add to the drag of the hull and are susceptible to damage.

Gyroscopic boat stabilization is another technology for roll suppression that is based on the gyroscopic effect. A control moment gyroscope (CMG) is mounted in the boat and generates a torque that can be used to counteract the rolling motion of the boat. The CMG includes a flywheel that spins at a high speed. A controller senses the attitude of the boat and uses the energy stored in the flywheel to "correct" the attitude of the boat by applying a torque to the hull counteracting the rolling motion of the boat. CMGs work not only when a boat is underway, but also when the boat is at rest. CMGs are also typically less expensive than stabilizer fins, do not add to the drag of the hull, and are not exposed to risk of damage from external sources.

Although CMGs are gaining in popularity, particularly for smaller fishing boats and yachts, this technology has some limitations. The energy used to counteract the rolling motion of the boat comes from the angular momentum of the rotation of the flywheel at a high rate of speed. Consequently, heat builds up in the bearings supporting the flywheel and bearing failure can result if the operational temperature of the bearings is exceeded. The flywheel is typically mounted inside an enclosure for safety reasons. In order to obtain the high spin rate, the flywheel is typically contained in a vacuum enclosure, which makes heat dissipation problematic.

Another problem with existing CMGs is that it takes a significant amount of time for the flywheel to "spin up", i.e., to obtain its desired operating speed. In some CMGs currently on the market, it can take as long as seventy minutes before the CMG is ready for use. The long "spin up" period means that the CMG cannot be used for trips of short duration, which comprises a majority of boating occasions. It also takes a long time for the flywheel to "spin down," typically in the order of several hours. While the flywheel is spinning down, it may continue to make a whining noise, which can be disruptive to the enjoyment of the occupants after the boat has arrived at its destination on the water or returned to the docks following a day of boating.

Thus, there remains a need for alternative approaches to gyroscopic boat stabilization, advantageous approaches that allow for better cooling of the bearings and/or motor, so that performance can be improved.

SUMMARY

The present disclosure relates to a gyroscopic roll stabilizer for a boat. In an aspect, the gyroscopic roll stabilizer includes an enclosure mounted to a gimbal for rotation about a gimbal axis and configured to maintain a below-ambient pressure, and a flywheel assembly including a flywheel and flywheel shaft, with the flywheel assembly rotatably mounted inside the enclosure for rotation about a flywheel axis. The gyroscopic roll stabilizer also includes a motor operative to rotate the flywheel assembly and disposed inside the enclosure. A motor cooling circuit is configured to transfer heat away from the motor. The motor cooling circuit has a closed fluid pathway for recirculating cooling fluid therein. The fluid pathway includes a fluid channel jointly defined by the motor and the enclosure and having the cooling fluid therein. The gyroscopic roll stabilizer is configured to transfer heat away from the motor to the cooling fluid. Optionally, the enclosure comprises an integrally formed boss for mounting the motor, and the inner face of the boss, facing the motor, comprises a groove. The groove defines at least a portion of the fluid channel.

Other aspects of the disclosure relate to methods of operating a gyroscopic roll stabilizer for a boat. The method includes maintaining a below ambient pressure within an enclosure surrounding a flywheel assembly, the flywheel assembly including a flywheel and a flywheel shaft; spinning the flywheel assembly about a flywheel axis via a motor mounted internal to the enclosure; dissipating heat from the motor by transferring the heat by conduction and convection to a cooling fluid flowing through a fluid channel jointly defined by the motor and the enclosure; cooling the cooling fluid by removing heat from the cooling fluid external to the portion of the enclosure maintained at the below-ambient pressure; and recirculating the cooling fluid through a closed fluid pathway that includes the fluid channel. Optionally, the enclosure comprises an integrally formed boss for mounting the motor, and the inner face of the boss, facing the motor, comprises a groove. The groove defines at least a portion of the fluid channel.

The features, functions and advantages that have been discussed above, and/or are discussed below, can be achieved independently in various aspects or may be combined in yet other aspects, further details of which can be seen with reference to the following description and the drawings.

BRIEF DESCRIPTION OF THE DRAWINGS

FIG. 13 shows an alternative design of a motor cooling system using a cooling ring.

DETAILED DESCRIPTION

Figure 1A:
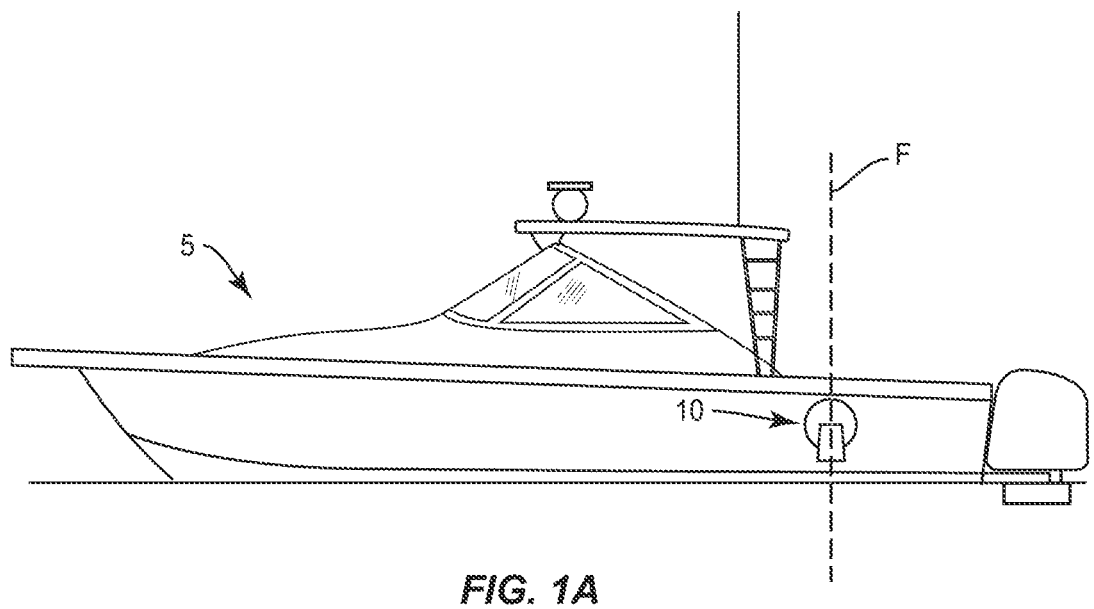
FIGS. 1A and 1B illustrate a boat equipped with a CMG as herein described.
Figure 1B:
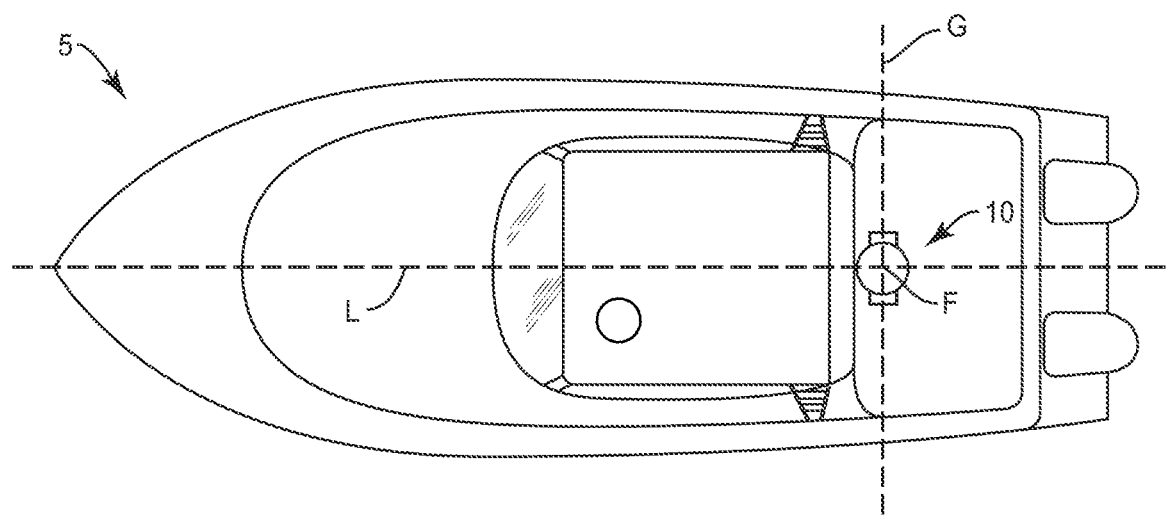

Referring now to the drawings, FIGS. 1A and 1B illustrate a control moment gyroscope (CMG) 10 mounted in a boat 5 for roll stabilization. Multiple embodiments of the CMG 10 are described. For convenience, similar reference numbers are used in the following description of the embodiments to indicate similar elements in each of the embodiments.

Figure 2:
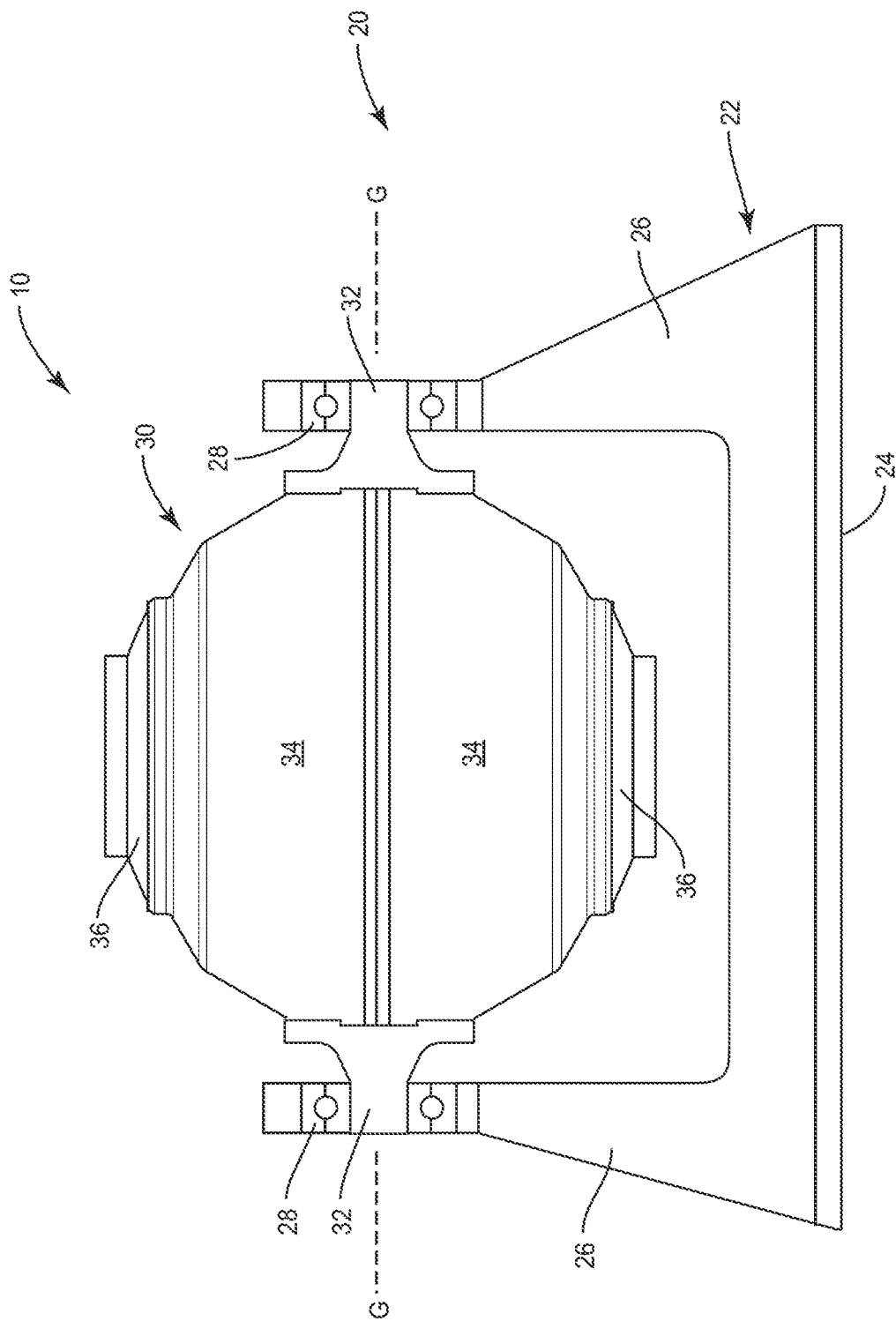
FIG. 2 show an elevation view of a CMG configured as a boat roll stabilizer according to an embodiment.
Figure 3:
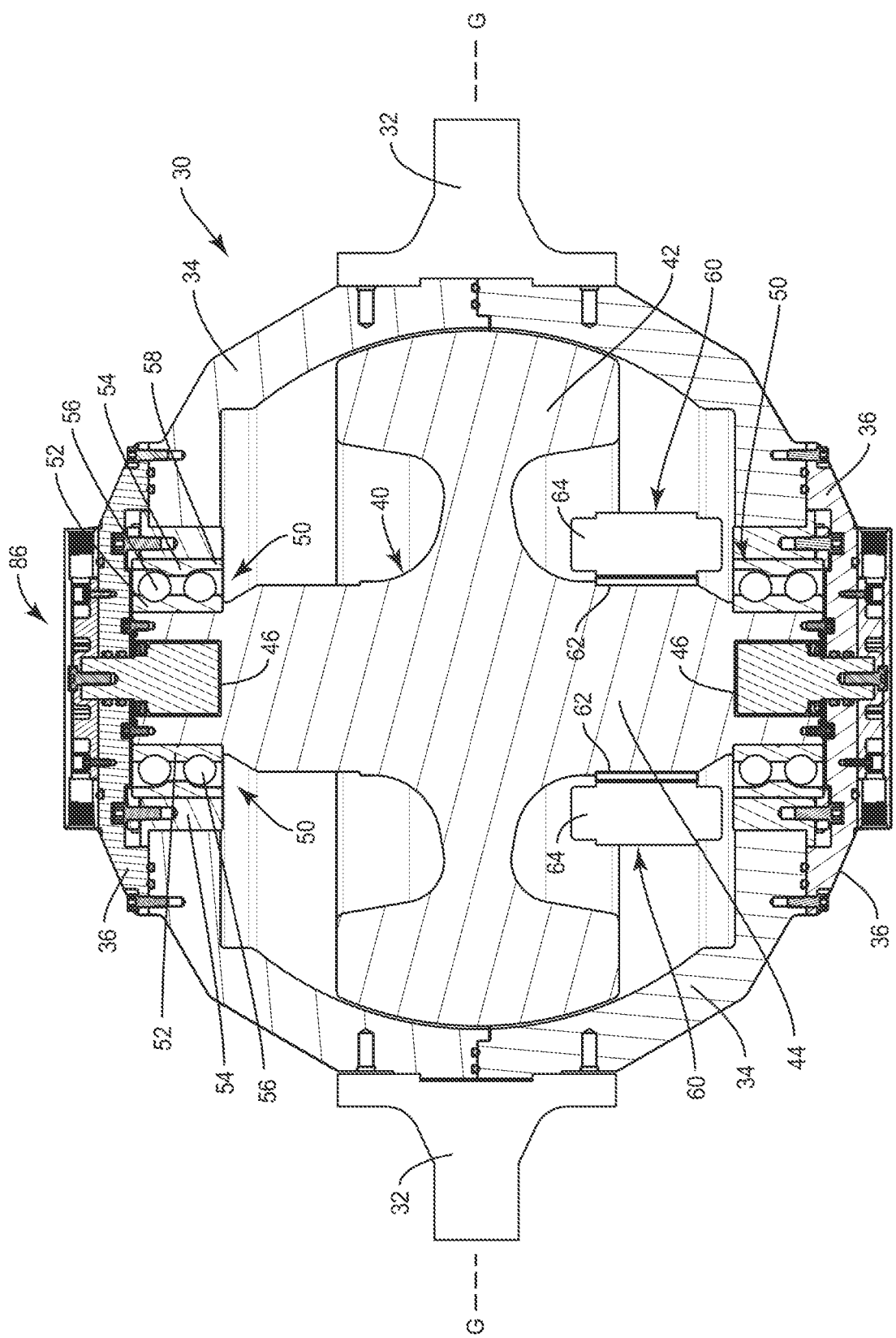
FIG. 3 shows a section view through the enclosure of a CMG according to an embodiment.

Referring now to FIGS. 2 and 3, the main functional elements of the CMG 10 comprise a single-axis gimbal 20, an enclosure 30 mounted to the gimbal 20 for rotation about a gimbal axis G, a flywheel assembly 40 mounted by bearings 50 inside the enclosure, a motor 60 to rotate the flywheel assembly 40, and a torque control system 70 (FIG. 5) to control precession of the flywheel assembly 40 so that the energy of the flywheel assembly 40 is transferred to the hull of the boat 5 to counteract rolling motions. Each of the embodiments further comprises a bearing cooling system 100 (FIG. 4) to cool the flywheel bearings 50. Various designs of the bearing cooling system 100 may be employed.

The gimbal 20 comprises a support frame 22 that is configured to be securely mounted in the boat 5. Preferably, the gimbal 20 is mounted along a longitudinal axis L of the boat 5 with the gimbal axis G extending transverse to the longitudinal axis L. Conventionally, the gimbal 20 is mounted in the hull of the boat 5, but could be mounted at any location. The support frame 22 of the gimbal 20 comprises a base 24 and two spaced-apart supports 26. A bearing 28 is mounted on each support 26 for rotatably mounting the enclosure 30 to the supports 26. For this purpose, the enclosure 30 includes two gimbal shafts 32 projecting from diametrically opposed sides of the enclosure 30. The gimbal shafts 32 are rotatably journaled in the gimbal bearings 28 to allow the enclosure 30 and flywheel assembly 40 to rotate or precess about the gimbal axis G in the fore and aft directions.

The basic elements of enclosure 30 are the same in the various embodiments described herein but vary in some details depending on the design of the bearing cooling system 100. The enclosure 30 is generally spherical in form and comprises two main housing sections 34 and two cover plates 36. The two main housing sections 34 join along a plane that typically bisects the spherical enclosure 30. The cover plates 36 join the main housing sections 34 along respective planes closer to the "poles" of the spherical enclosure 30. All joints in the enclosure are sealed to maintain a below-ambient pressure within the enclosure 30 to reduce aerodynamic drag on the flywheel assembly 40. Typical below-ambient pressures should be in the range of 1-40 torr (133-5333 Pa, 0.02-0.77 psi). Although the construction of the enclosure is generally the same in the embodiments herein described, the details of the housing sections 34 and cover plates 36 vary as described more fully below depending on the design of the bearing cooling system used.

Referring to FIG. 3, the flywheel assembly 40 comprises a flywheel 42 and flywheel shaft 44 that is mounted for rotation inside the enclosure 30 of the gimbal 20 so that the axis of rotation F of the flywheel assembly 40 is perpendicular to the gimbal axis G. Thus, when the boat 5 is level such that gimbal axis G is horizontal, the axis of rotation F of the flywheel shaft 44 will be in the vertical direction, typically perpendicular to the deck of the boat. The flywheel 42 and shaft 44 may be formed as a unitary piece, or may comprise two separate components. In one exemplary embodiment, the diameter and the flywheel 42 is approximately 20.5 inches and the flywheel assembly 40 has a total weight of about 614 lbs. The flywheel assembly 40 has a moment of inertia of about 32,273 lbm in$^2$. When rotated at a rate of 9000 rpm, the angular momentum of the flywheel assembly 40 is about 211,225 lbm ft$^2$/s.

The flywheel assembly 40 is supported by upper and lower bearing assemblies inside the enclosure 30. Each bearing assembly comprises a bearing 50 mounted within a bearing block 58. Each bearing 50 comprises an inner race 52 that is affixed to and rotates with the flywheel shaft 44, an outer race 54 that is mounted inside the bearing block 58, and one or more ball bearings 56 disposed between the inner and outer races 52, 54. The bearing blocks 58 are secured to the interior of the enclosure 30. Seals (not shown) are disposed on the top and bottom of the bearings 50 to contain lubricant in the bearings 50.

The motor 60 rotates the flywheel assembly 40 at a high rate of speed (e.g., 9000 rpm). The motor 60 includes a rotor 62 that connects to the flywheel shaft 44 and a stator 64 that this secured to the enclosure 30 by any suitable mounting system. Although the motor 60 is shown mounted inside the enclosure 30, it is also possible to mount the motor 60 on the exterior of the enclosure 30. In one embodiment, the motor 60 operates on 230 Volt single phase AC power (or could be three-phase AC power, or AC or DC battery power, such as from a lithium ion battery pack) and is able to accelerate a flywheel assembly with a moment of inertia of about 32,273 lbm in2 from rest to a rotational speed of 9000 rpm preferably in about 30 minutes or less for an average acceleration of about 5 rpm/s, and more preferably in about 20 minutes or less for an average acceleration of about 7.75 rpm/s, and even more preferably in about 10 minutes or less for an average acceleration of about 15 rpm/s (or 1.57 radians/s2).

Figure 5:
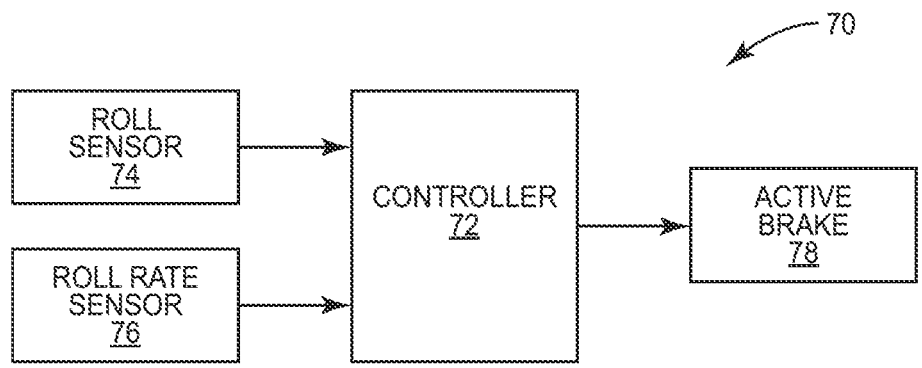
FIG. 5 shows a cooling circuit for a CMG.

The torque control system 70, shown in FIG. 5, controls the rate of precession of the flywheel assembly 40 about the gimbal axis G. The rolling motion of a boat 5 caused by wave action can be characterized by a roll angle and roll rate. The rolling motion causes the flywheel 42 to precess about the gimbal axis G. Sensors 74, 76 measure the roll angle and roll rate respectively, which are fed to a controller 72. The controller 72 generates control signals to control an active braking system or other torque applying device 78 that controls the rate of precession of the flywheel assembly 40.

By controlling the rate of precession, the flywheel assembly 40 generates a torque in opposition to the rolling motion. This torque is transferred through the gimbal 20 to the boat 5 to dampen the roll of the boat 5. An example of the active braking system 78 is described in U.S. Patent Application Publication No. 2020/0137308, entitled "Braking System For Gyroscopic Boat Roll Stabilizer", which is incorporated herein its entirety by reference.

When the flywheel assembly 40 rotates at high speed, the bearings 50 and motor 60 will generate a substantial amount of heat, which could lead to bearing and/or motor failure. Conventional air and liquid cooling techniques are not suitable for bearings 50 or other heat generating components contained within a vacuum or significantly below ambient pressure environment. Various embodiments of the bearing cooling system 100 are disclosed herein allow cooling of bearings 50 and other heat generating components contained within the enclosure without direct contact of the recirculated oil or liquid coolant with the bearings 50 or other moving heat generating components, which would result in high frictional losses. In general, heat is transferred by solid and/or liquid conduction to a heat sink that is cooled by oil, glycol, or other liquid coolant. Oil or liquid cooling enables more heat to be dissipated compared to air cooling or gaseous convection and conduction. Reliance on gaseous convection and conduction in existing CMGs imposes limitations on the amount of heat that can be dissipated because the interior of the enclosure 30 is typically maintained at a below ambient pressure. The limited heat transfer capacity in conventional CMGs imposes limitations on the size of the electric motor that is used, which in turn limits the time to engage and use the conventional CMG. Because the electric motor in conventional CMGs is undersized to avoid heat generation, conventional CMGs require significant time to accelerate the flywheel assembly 40 to a speed that provides the desired counter-torque and roll stabilization. Providing more efficient cooling of the bearings 50 and/or motor 60 as herein described enables use of a larger and more powerful motor 60 and faster acceleration of the flywheel assembly 40 so that the benefits of using the CMG 10 can be obtained in significantly shorter time periods.

Figure 6:
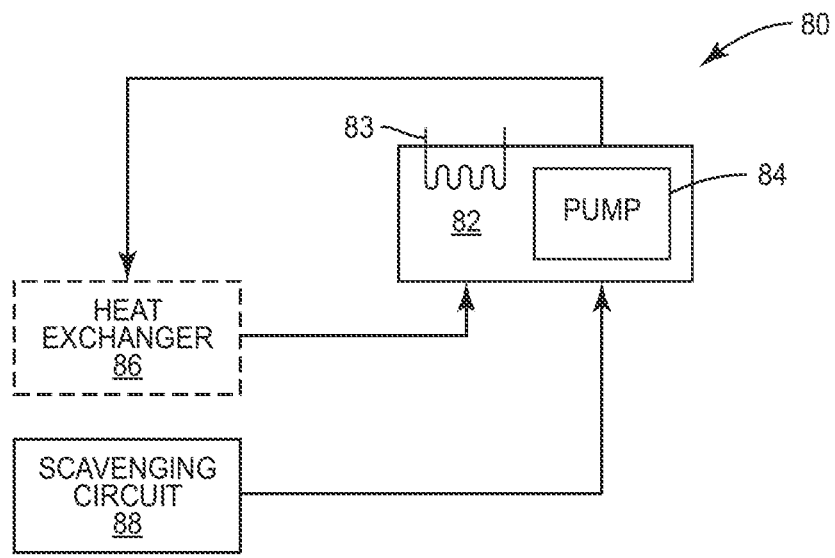
FIG. 6 shows a torque control system for the CMG.

FIG. 6 is a schematic diagram of a cooling circuit 80 for circulating the liquid coolant. A fluid reservoir 82 contains the liquid coolant which is circulated in a "closed" circuit by a fluid pump 84. The fluid reservoir 82 may include a heat exchanger 83 to cool the liquid coolant in the fluid reservoir 82. After leaving the fluid reservoir 82, the liquid coolant passes through the heat exchanger 86 where it adsorbs and carries away heat generated by the bearings 50, as described more fully below. In some embodiments, heat is transferred from the flywheel shaft 44 to a heat sink and then by solid and liquid conduction to the heat exchanger 86. In other embodiments, heat is transferred from the flywheel shaft 44 to the liquid coolant which is circulated through a cavity 46 in the flywheel shaft 44. Accordingly, the heat transfer to the liquid coolant occurs within the cavity 46 of the flywheel shaft 44 so the heat exchanger 86 is not required. In some embodiments, a scavenging circuit 88 is provided to collect liquid coolant that may seep into the interior of the enclosure 30 and return the liquid coolant to the fluid reservoir 82.

Figure 4:
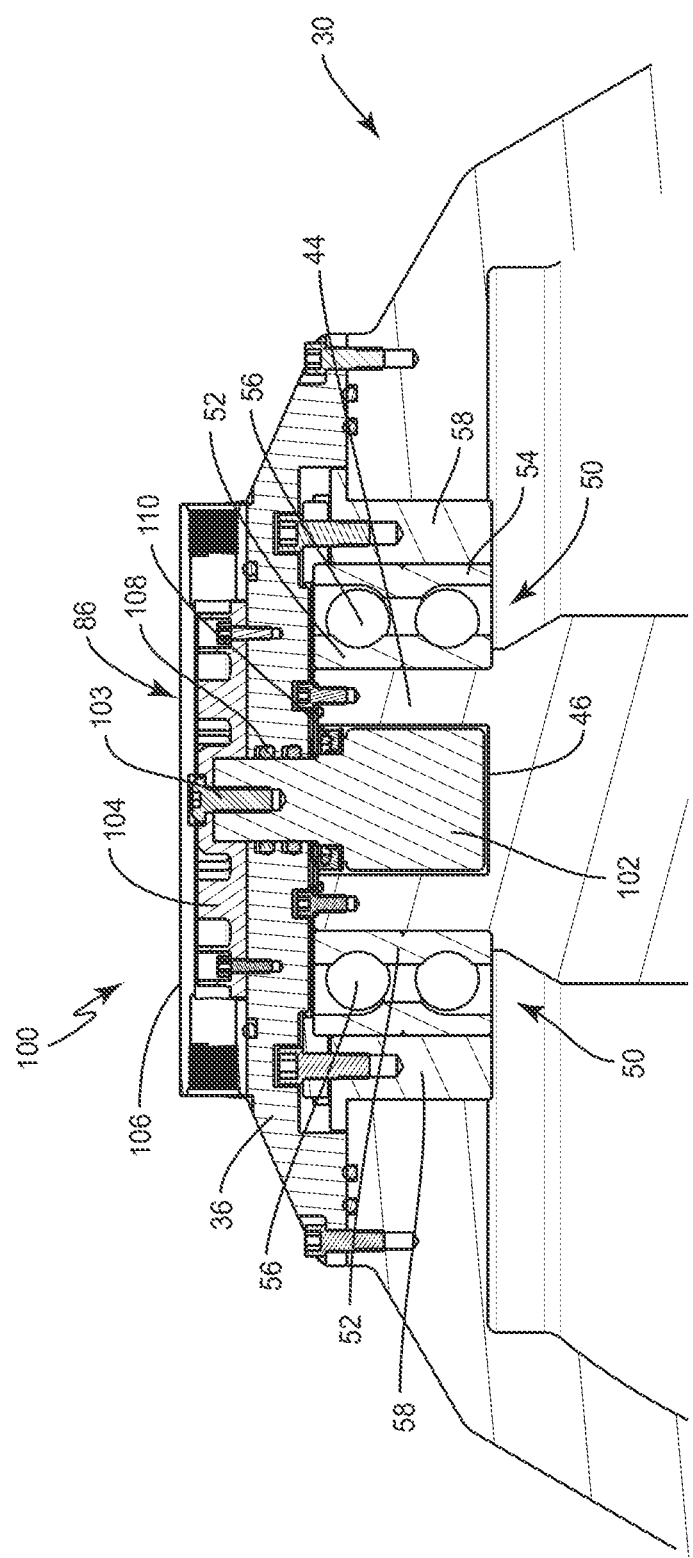
FIG. 4 shows a partial section view of FIG. 3.

FIG. 4 illustrates one embodiment of a bearing cooling system 100 using a heat sink to dissipate heat generated by the bearings 50 and/or motor 60. While the present discussion of the bearing cooling system 100 is generally in the context of cooling the upper bearing 50, it should be noted that the upper and lower bearings 50 may be cooled in similar ways, if desired. For the upper bearing 50, the upper portion of the flywheel shaft 44 is secured within bearing 50 that is, in turn, secured within the enclosure 30. Each bearing 50 includes an outer race 54, one or more ball bearings 56, and an inner race 52 that engages the flywheel shaft 44 and rotates therewith. The flywheel shaft 44 includes a cavity 46 at each end thereof. The cavity 46 in each end of the flywheel shaft 44 is open at one end and includes a side wall and a bottom wall.

A heat transfer member 102 that functions as a heat sink is suspended in the cavity 46. The heat transfer member 102 does not directly engage the side or bottom walls of the cavity 46. Rather, the outer surface of the heat transfer member 102 is spaced from the side and bottom walls of the cavity 46. In one embodiment, the spacing between the heat transfer member 102 and the walls of the cavity 46 is approximately 0.035"-0.095". Various materials can be used for the heat transfer member 102 discussed herein. Preferably, copper, aluminum, or alloys thereof are used because of their relatively high thermal conductivity.

A heat transfer medium is contained in the gap between the heat transfer member 102 and the walls of the cavity 46. As one example, the heat transfer medium comprises a low vapor pressure fluid that is suitable for the low pressure environment in the enclosure 30. A low vapor pressure fluid is a liquid, such as oil, that has a relatively low boiling point compared to water and is suitable for employment in a vacuum environment. For example, aerospace lubricants, such as perfluoropolyether (PFPE) lubricants, designed for vacuum environments can be used as the heat exchange medium. The low vapor pressure fluid enables transfer of heat from the flywheel shaft 44 to the heat transfer member 102 by liquid conduction and liquid convection. A labyrinth seal 110 extends around the heat transfer member 102 and effectively seals the cavity 46 such that the heat transfer medium is maintained within the cavity 46. The labyrinth seal 110 is preferably fixed to the heat transfer member 102, which means that the flywheel shaft 44 rotates around the labyrinth seal 110.

As seen in FIG. 4, heat transfer member 102 projects from cavity 46, through an opening in a cover plate 36 forming a part of the enclosure 30, and into a heat exchanger 86. Seals 108 located in corresponding grooves in the cover plate 36 maintain vacuum within the enclosure 30. The heat exchanger 86 is mounted to the exterior surface of the cover plate 36. The heat exchanger 86 comprises a housing 106 and a heat exchange plate 104 confined within the housing 106. The heat transfer member 102 is secured by a fastener 103 to the heat exchange plate 104 so that the heat transfer member 102 is effectively suspended in the cavity 46 formed in the flywheel shaft 44. More particularly, the heat exchange plate 104 includes a recess in the bottom surface thereof that receives the end of the heat transfer member 102. The surface contact between the end of the heat transfer member 102 and the heat exchange plate 104 facilitates the efficient transfer of heat by solid conduction from the heat transfer member 102 to the heat exchange plate 104.

A liquid coolant, such as a glycol coolant, is circulated through the heat exchanger 86 to absorb and carry heat away from the heat exchange plate 104 as shown in FIG. 5. The upper surface of the heat exchange plate 104 can be provided with fluid channels and/or cooling fins to increase surface area of the heat exchange plate 104 and to facilitate heat transfer from the heat exchange plate 104 to the liquid coolant.

Heat is generated in the inner and outer races of the bearing assemblies 50 due to the high side loads generated from the CMG's torque as the enclosure 30 rotates about the gimbal axis G. The outer race 54 has a continuous heat conductive path through the enclosure 30 which permits the heat associated with the outer race 54 to be conveyed into the atmosphere. The inner race 52 requires a heat sink path through parts of the enclosure 30. In this embodiment, heat from the inner race 52 of the bearing assembly 50 is transferred by solid conduction to the flywheel shaft 44. The heat is then transferred by liquid conduction from the flywheel shaft 44 to the heat transfer member 102, and by solid conduction through the heat transfer member 102 to the heat exchange plate 104 that continuously conveys the heat into surrounding liquid coolant. In some embodiments, the heat exchanger 86 could employ air or gas cooling rather than liquid cooling.

Alternative approaches to bearing cooling systems 100 for cooling the bearing assemblies 50 may be employed, including the use of heat transfer members 102 that are internally cooled via circulation of cooling fluid internally through the heat transfer member 102. The various bearing cooling systems 100 may be used alone, or in combination with the motor cooling systems (e.g., motor cooling circuit 220) described herein. Just by way of example, the CMG 10 may include the motor cooling system(s) of FIGS. 7-13, and the bearing cooling system(s) described above, or just the bearing cooling system(s) described above, or just the motor cooling system(s) of FIGS. 7-13.

FIGS. 7-11 show a motor cooling system for cooling the motor 60 when the motor 60 is mounted inside the enclosure 30. In general, the motor cooling system includes a motor cooling circuit 220 that includes a closed fluid pathway 222. The fluid pathway 222 extends through a fluid channel 224 disposed in close proximity to the motor 60. Cooling fluid 90 flows through the fluid pathway 222 (including through the fluid channel 224), and absorbs heat from the motor 60 and transfers that heat away from the motor 60.

Figure 7:
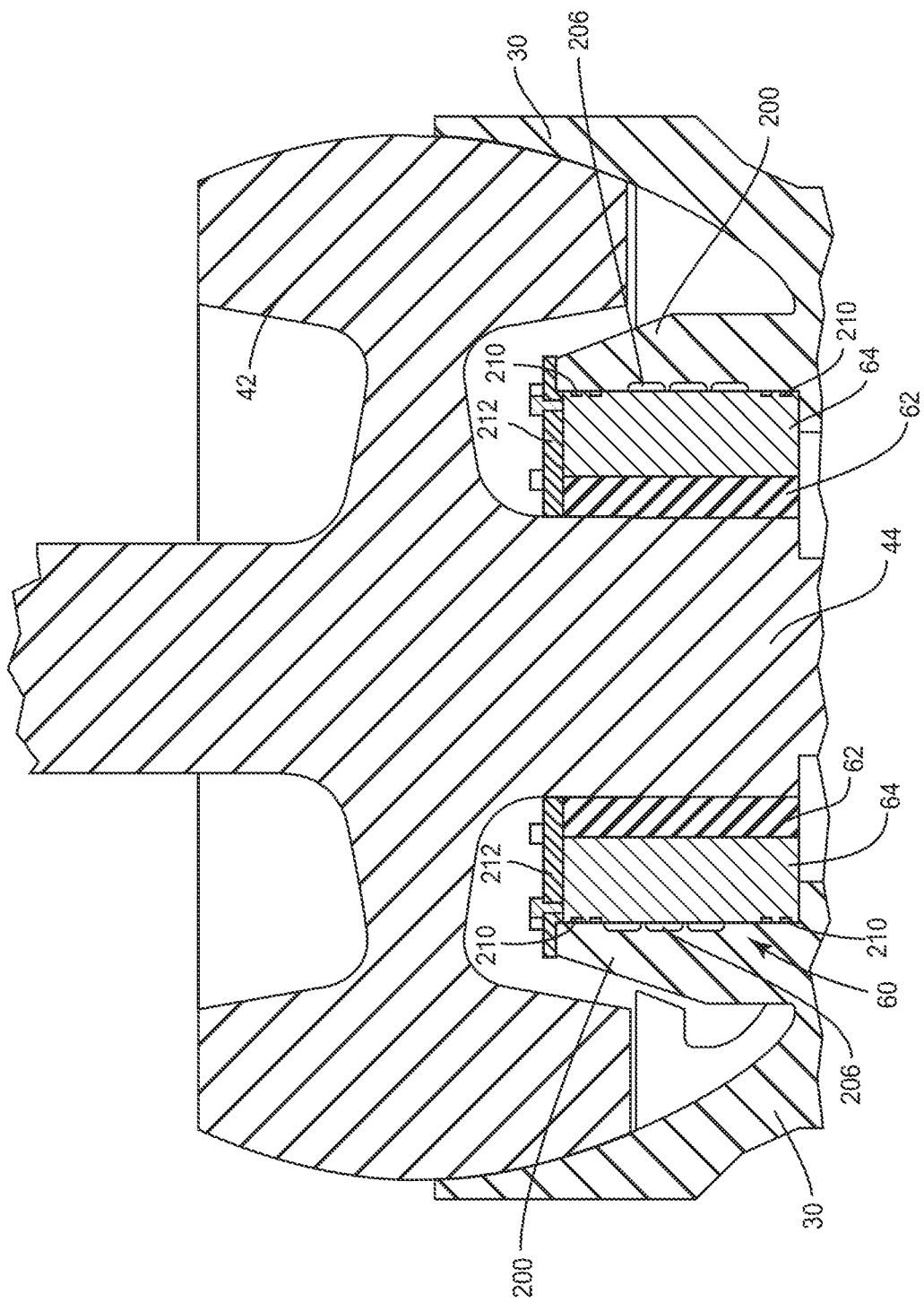
FIG. 7 shows a partial cross-section view of a CMG showing a motor, boss, and cooling channels that are part of a motor cooling system.

As shown in FIG. 7, the enclosure 30 includes a boss 200 that is integrally formed with enclosure 30, and is configured to receive the motor 60 for mounting the motor 60 in the enclosure 30. The boss 200 extends inwardly into the interior of the enclosure 30, and toward the flywheel 42, generally parallel to the flywheel axis F. The boss 200 includes a chamber 202 generally aligned with the flywheel axis F, and advantageously peripherally surrounds the flywheel axis F. The chamber 202 is sized and shaped to receive the motor 60. The chamber 202 is bounded by an inner face 204 on the boss 200 which faces the motor 60. The stator 64 of the motor 60 advantageously abuts the inner face 204 or is at least very closely spaced therefrom. A plurality of seals 210 are advantageously abutting the stator 64 and the inner face 204, so that a fluid-tight seal is maintained. One or more retention plates 212 may be used to secure the motor in the boss 200.

Figure 8:
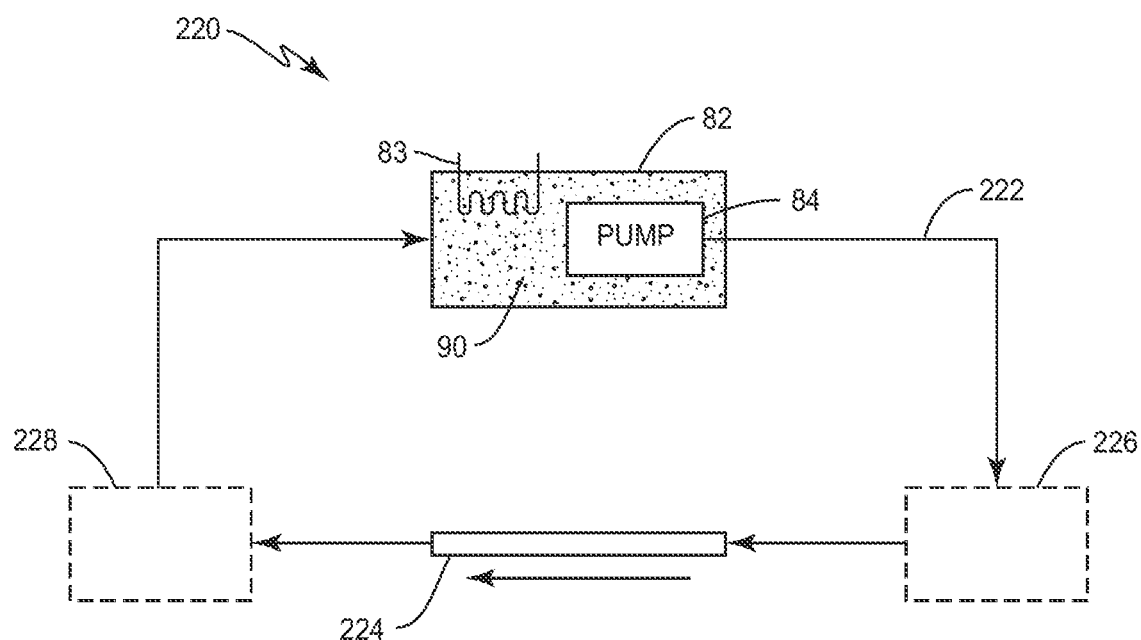
FIG. 8 shows a simplified schematic of a motor cooling circuit for cooling the motor.
Figure 9:
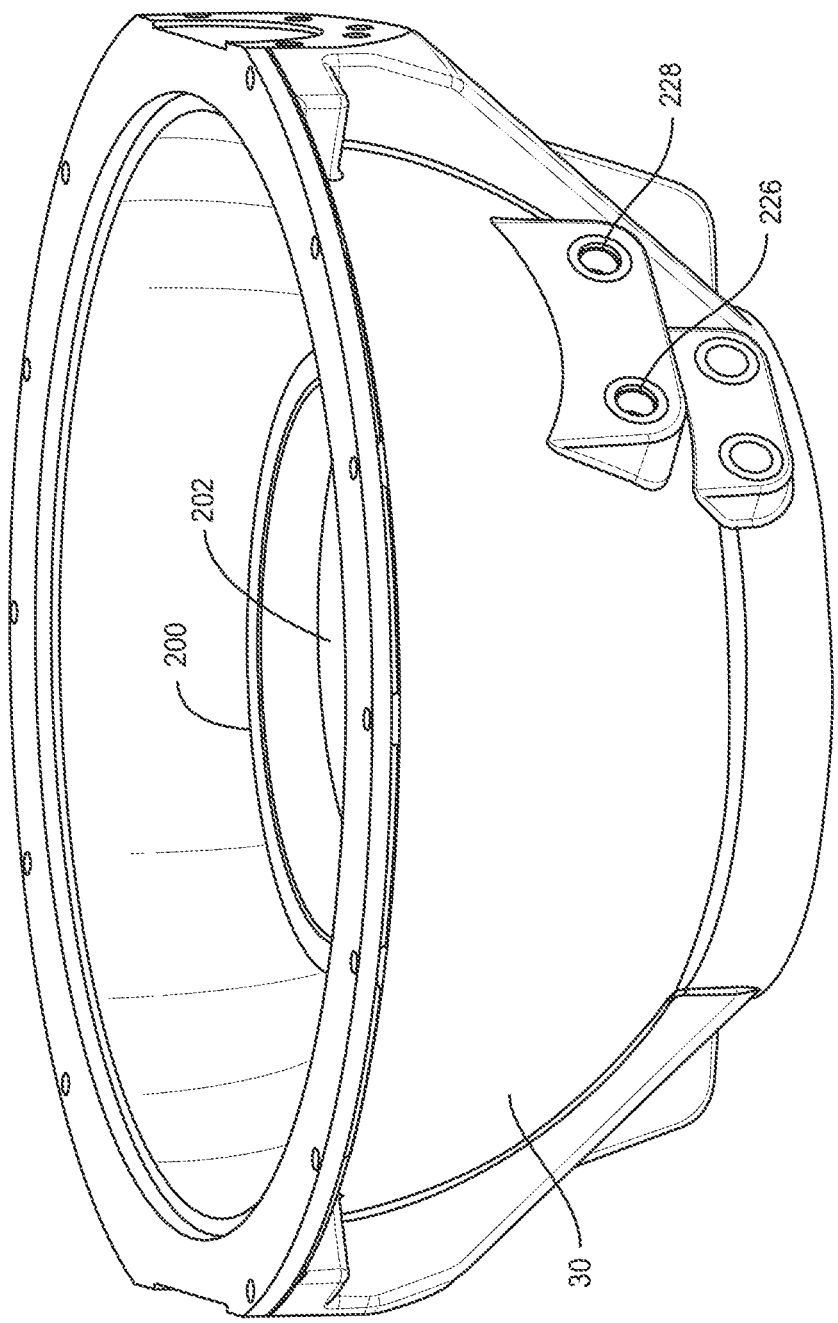
FIG. 9 shows a perspective view of a lower portion of an enclosure of a CMG suitable for use with a motor cooling system of FIGS. 7-8.
Figure 10:
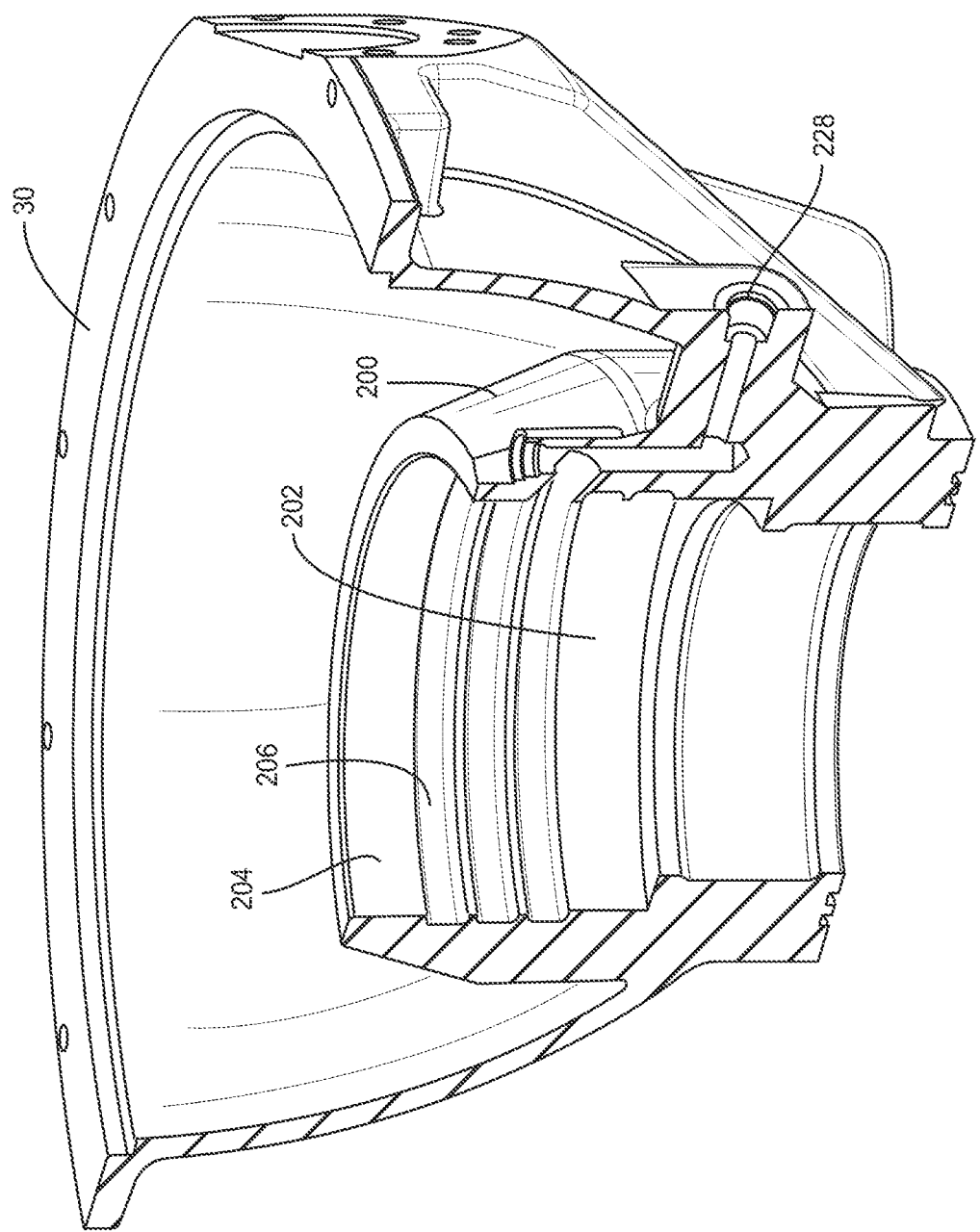
FIG. 10 shows another perspective view of the enclosure of FIG. 9.
Figure 11:
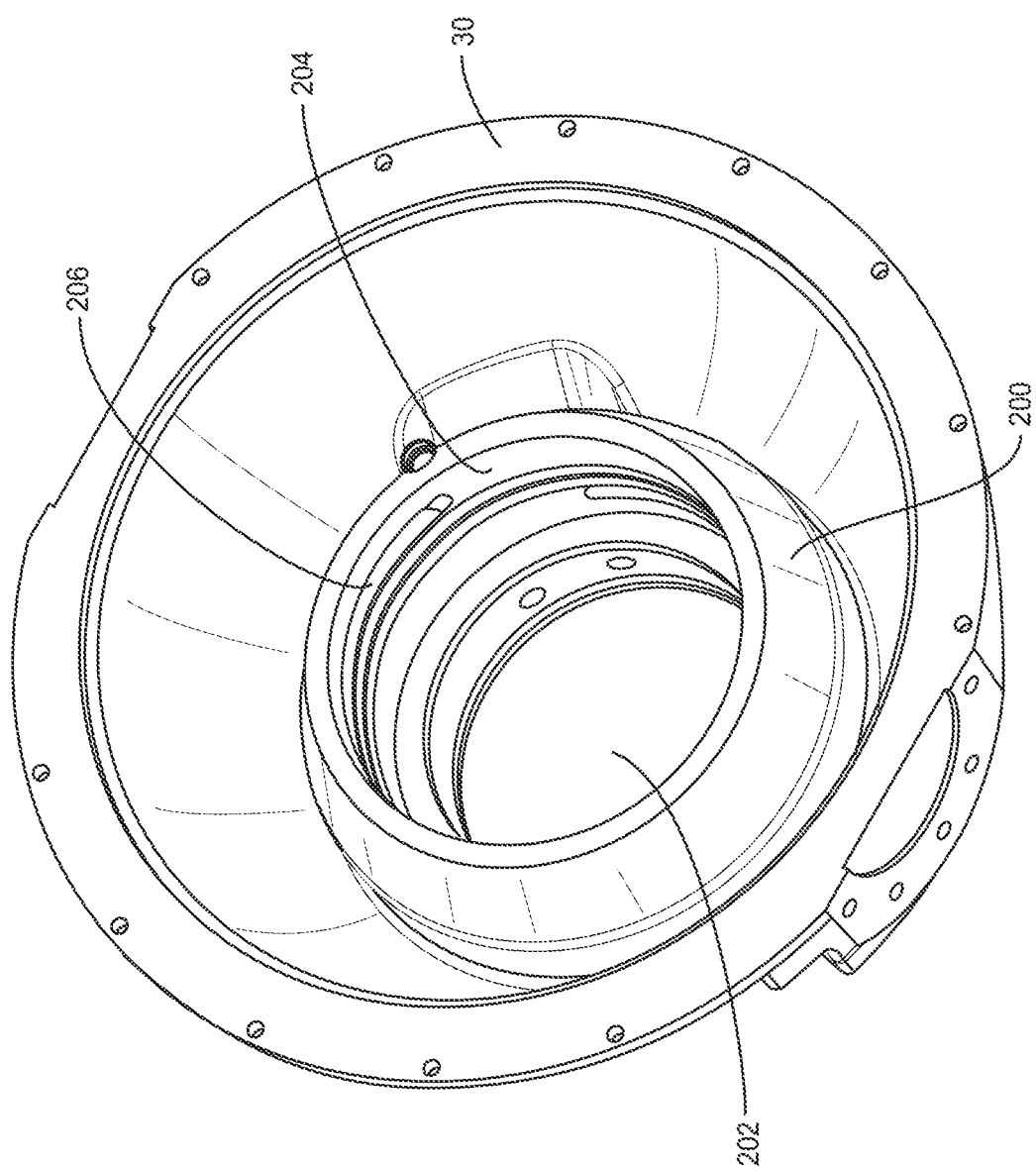
FIG. 11 shows a perspective cross-sectional view of the enclosure of FIG. 9.
Figure 12:
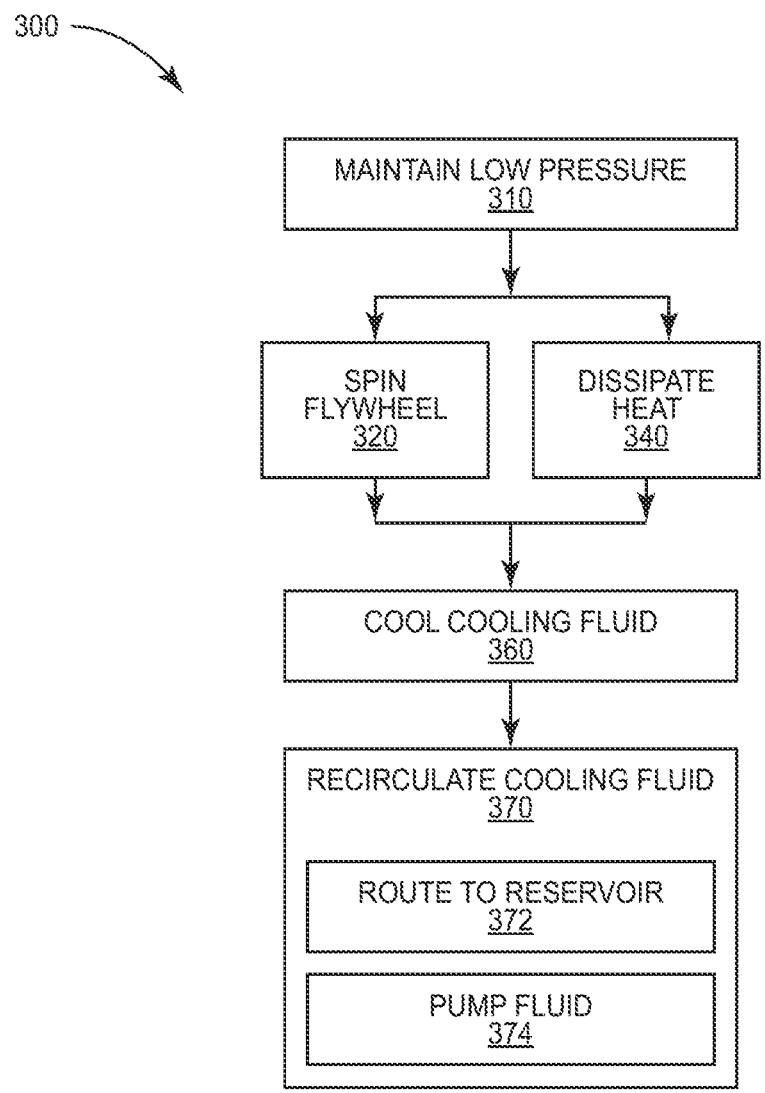
FIG. 12 shows simplified flowchart of an exemplary method for cooling the motor.

The motor cooling circuit 220 is schematically shown in FIG. 8. The motor cooling circuit 220 includes the fluid pathway 222, which in turn includes the fluid channel 224. The fluid channel 224 is jointly defined by the motor 60 and the enclosure 30, meaning for a given section of the fluid channel 224, the motor 60 forms a part of the channel wall for that section, and the enclosure 30 forms another part of the channel wall of that section that overlaps (along the path of the channel) with the part of the channel wall formed by the motor 60. In FIG. 8, the fluid channel 224 is formed at the interface between the stator 64 and the inner face 204 of boss 200 of enclosure 30. The inner face 204 includes one or more grooves 206. See FIGS. 7, 9-11. Such groove(s) 206 are conceptually closed off, to form the fluid channel 224, by the outer face of stator 64. Note that seals 210 may be used to trap any cooling fluid 90 that escapes fluid channel 224. Alternatively and/or additionally, the stator 64 may include one or more grooves 206 (not shown) on its outer face that face the inner face 204 of the boss 200. Such stator groove(s) 206 are conceptually closed off, to form the fluid channel 224, by the inner face 204 of the boss 200. Note that the groove(s) 206 may be oriented perpendicular to the flywheel axis F, or may advantageously spiral around the flywheel axis F, such as by being helical or other spiral shape. Alternatively, the groove(s) may wind around the interface of the boss 200 and the stator 64 in any suitable fashion, such as in a sinusoidal shape, or a zig-zag shape, whether regular or irregular. Advantageously, the fluid pathway 222 peripherally surrounds the flywheel axis F, such as by circumnavigating motor. The flow direction in the fluid pathway 222 may be in any suitable direction, such as clockwise or counter-clockwise, or both as appropriate. When the fluid channel 224 is spiral (e.g., helical), the cooling fluid advantageously flows through the fluid channel 224 spirally (e.g., helically) either outward away from the flywheel 42, or inward toward flywheel 42.

As shown in FIG. 8, the motor cooling circuit 220 optionally also includes a reservoir 82 for the cooling fluid 90 flowing through the motor cooling circuit 220, and a fluid pump 84 operative to recirculate the cooling fluid 90 through motor cooling circuit 220. Thus, the fluid pathway 222 for the cooling fluid 90 optionally extends through the fluid reservoir 82, the fluid channel 224, and the fluid pump 84. Thus, the pump 84 is operatively connected to the fluid channel 224 and configured to recirculate the cooling fluid 90 through the fluid channel 224 to remove heat from the motor 60. The presence of the motor cooling circuit 220 in the gyroscopic roll stabilizer 10 allows the gyroscopic roll stabilizer 10 to be configured to transfer heat away from the motor 60 to the cooling fluid 90. Note that a heat exchanger, such as heat exchanger 83, is operatively connected to closed fluid pathway 222 and configured to remove heat from the cooling fluid 90 to ambient after the cooling fluid 90 has passed through the fluid channel 224.

In some respects, the fluid pathway 222 also includes an inlet port 226 and an outlet port 228, such as on the enclosure 30. The inlet port 226 is operatively disposed between the pump 84 and the fluid channel 224, and operative to allow passage of the cooling fluid 90 into the enclosure 30 toward the fluid channel 224. The outlet port 228 is operatively disposed between the fluid channel 224 and the heat exchanger 83, and operative to allow passage of the cooling fluid 90 out of the enclosure 30 toward the heat exchanger 83.

For the FIG. 7 arrangement, the heat flow for dissipating heat from the motor 60 is from the stator 64 to the cooling fluid 90 in the fluid channel 224, then to external to the CMG 10 via the heat exchanger 83. Note that the heat is transferred by conduction and convection to the cooling fluid 90.

In an alternative design shown in FIG. 13, the fluid channel 224 is not jointly defined by the motor 60 and the enclosure 30, but is instead formed in a separate element that is disposed between the stator 64 and the enclosure 30. For example, a separate cooling ring 240 may surround (e.g., be disposed immediately outside of) the stator 64, between the stator 64 and the enclosure 30 in a lateral direction as shown in FIG. 13. The cooling ring 240 should be fluid-tight, and may have one or more internal passages that define the fluid channel 224. There may be one or more fins 244 internal to the cooling ring 240 that form the internal passages. The internal passages may be substantially circular, or may advantageously spiral around the flywheel axis F, such as by following a helical path. The fluid channel 224 may be connected, via suitable connections and seals, with the inlet port 226 and outlet port 228. Cooling fluid 90 may circulate through the fluid channel 224 in the cooling ring 240 to extract heat from the motor 60 and move that heat away from the motor 60. Care should be taken to properly secure the cooling ring 240 inside the enclosure 30, such as by suitable screws, to avoid possible damage to the rapidly spinning flywheel 42. Because use of such a cooling ring 240 results in the cooling fluid 90 being separated from the stator 64 by the wall of the cooling ring 240, this approach is believed to be functional, but less efficient than other approaches disclosed herein.

In some aspects, the CMG 10 includes both the bearing cooling system 100 and the motor cooling system (e.g., motor cooling circuit 220) described herein, and the two systems may optionally use a common reservoir 82, pump 84, and heat exchanger 83 so as to share the cooling fluid 90.

A method (300) of operating a gyroscopic roll stabilizer 10 that includes a motor cooling circuit 220 as discussed above is shown in FIG. 12. The method (300) includes maintaining (310) a below ambient pressure within an enclosure 30 surrounding a flywheel assembly 40, with the flywheel assembly 40 including a flywheel 42 and a flywheel shaft 44. The method also includes spinning (320) the flywheel assembly 40 about the flywheel axis F via motor 60 mounted internal to the enclosure 30. In addition, the method includes dissipating (340) heat from the motor 60 by transferring the heat by conduction and convection to a cooling fluid 90 flowing through a fluid channel 224 jointly defined by the motor 60 and the enclosure 30. During the dissipating, the cooling fluid 90 optionally flows through the fluid channel 224 helically in an outward direction away from the flywheel 42. Further, the method includes cooling (360) the cooling fluid 90 by removing heat from the cooling fluid 90 external to the portion of the enclosure 30 maintained at the below-ambient pressure. In addition, the method includes recirculating (370) the cooling fluid 90 through closed fluid pathway 222 that includes the fluid channel 224. Note that the recirculating (370) optionally includes routing (372) the cooling fluid from the fluid channel 224 to reservoir 82, and pumping (374) the cooling fluid 90 from the reservoir 82 to the fluid channel 224, and the cooling (360) the cooling fluid 90 comprises cooling the cooling fluid 90 via a heat exchanger 83 disposed external to the enclosure 30. Note that the various steps of method may be carried out in any suitable order, including in whole or in part in parallel. For example, at least the maintaining (310), the spinning (320), and the dissipating (340) are advantageously carried out simultaneously.

The bearing cooling systems 100 and/or motor cooling systems as herein described allow much greater heat dissipation compared to current technology, which enables use of a larger motor 60, and advantageously lower operating temperature even with the larger motor The larger motor and lower operating temperature enable rapid spin up and spin down of the flywheel assembly 40, and a significantly lower time to engage as discussed further below.

In use, the gimbal 20 is normally locked during spin up, i.e., while the flywheel assembly is being accelerated, to prevent precession of the flywheel 42 until a predetermined rotational speed is achieved. The CMG 10 can be locked to prevent rotation of the enclosure 30 by the active braking system 78. When the CMG 10 is unlocked, precession of the flywheel 42 will place side loads on the bearings 50. The bearing friction from the side loading of the bearings generates heat. In addition, the bearing friction from the side loading also adds drag, which must be overcome by the motor 60 in order to continue acceleration of the flywheel's rotation. Thus, the frictional losses of side loading the bearings 50 have two impacts: generating heat and increasing the load on the motor 60.

Conceptually, there are two main sources of heat in the CMG: heat generated by the motor inside the enclosure 30 and heat generated by bearing friction. A large percentage of the heat budget is needed to dissipate heat from the bearings in order to prevent bearing failure. The remaining portion of the heat budget, after accounting for bearing cooling, determines the size of the motor that can be used inside the enclosure.

One conventional approach to bearing cooling for a CMG maintained in a vacuum environment uses interwoven fins and relies primarily on gaseous conduction between the interwoven fins to dissipate the heat. See, e.g., U.S. Pat. Nos. 7,546,782 and 8,117,930. The reliance on gaseous conduction as the primary mode of heat transfer severely limits the amount of heat that can be dissipated since gaseous conduction is less efficient than liquid or solid conduction. The heat transfer capacity of the interwoven fins is also limited by the surface area of the interwoven fins. Less surface area means less heat transfer capacity. As the enclosure of CMGs shrink in size, there is less space available for the interwoven fins. These factors place severe limits on the heat budget for conventional CMGs, which in turn limits motor size. Thus, conventional CMGs using interwoven fins for heat dissipation are limited in the size of their motor. The limitation on the motor size results in a poor acceleration profile for the flywheel in conventional CMGs, which in turn means a long waiting period before the conventional CMG can be used. Further, if the gimbal 20 in a conventional CMG is unlocked too early, the frictional losses will prevent the smaller motors used therein from accelerating the flywheel assembly 40, or will greatly diminish the acceleration of the flywheel assembly 40 resulting in a much longer spin up period. In conventional CMGs, the gimbal 20 is typically locked until the flywheel assembly 40 reaches 75-80% or more of the nominal operating rotational speed. Conventional CMGs currently on the market may take thirty minutes or longer to reach the minimum operating speed at which the flywheel can be allowed to precess. However, many boat trips, particularly on smaller boats, are thirty minutes or less. This means the waiting period before the time to engage (unlock the flywheel assembly for precessing) is reached is longer than many boat trips for conventional CMGs.

Further, the size of the motor in conventional CMGs places a floor on the minimum operating speed at which the conventional CMG can be engaged (i.e., unlocked). The bearing friction from the side loading of the bearings when the conventional is engaged dramatically decreases the already slow acceleration rate of conventional CMGs. In some cases, the frictional load may be too much for the motor to overcome so that the further acceleration of the flywheel assembly becomes impossible and the normal operating speed cannot be reached.

Another consideration is that the power to the motor is at its maximum when the flywheel is being accelerated, and is reduced when the flywheel reaches its normal operating speed. Thus, more heat is generated by the motor when it is accelerating. The additional heat generated by the motor also limits the time to engage because the additional heat from the motor may exceed the design limits of the bearing cooling system in conventional CMGs.

The bearing cooling systems 100 and/or motor cooling circuits 220 as described herein enable more efficient heat transfer, which enables a far greater heat transfer capacity and an increased heat budget. The increased heat budget means that larger and more powerful motors 60 that generate more heat can be used without causing bearing failure. With a larger and more powerful motor 60, the improved CMG 10 of the present disclosure is able to achieve greater acceleration of the flywheel assembly 40 and lower time to engage than a conventional CMG. In addition to the higher rates of acceleration, which naturally lead to lower times to engage assuming the same minimum operating speed, a larger motor 60 enables the flywheel assembly 40 to be engaged at a lower operating speed (e.g., a lower percentage of nominal operating speed), which further reduces the time to engage, because the larger motor 60 is able to overcome the additional friction from the loading of the bearings 50. In some embodiments, the motor 60 is configured to enable the CMG 10 to be unlocked in under twenty minutes, and preferably in under ten minutes and more preferably in under five minutes. By combining higher acceleration with lower operating speeds at the time of engagement, a time to engage can be reduced to a few minutes. For example, a motor 60 rated at 10,000 to 15,000 watts could potentially achieve a time to engage rates in the order of a few minutes.

As one example, the flywheel assembly 40 described above with a moment of inertia equal to about 32,273 lbm in2 can be accelerated from rest to 9000 rpm in about 30 minutes or less, which equates to an average acceleration of about 5 rpm/s or more, and preferably in about 20 minutes or less, which equates to an average acceleration of about 7.5 rpm/s or more, and even more preferably in about 10 minutes or less, which equates to an average acceleration of about 15 rpm/s or more. Additionally, the time to engage for the CMG 10 as herein described is much shorter because the motor 60 is powerful enough to overcome the frictional losses when the gimbal 20 is unlocked. For example, in a flywheel assembly 40 with a moment of inertia equal to about 32,273 lbm in2, the time to engage (assuming 75% of operating speed) is less than about 20 minutes, and more preferably less than about 10 minutes, and even more preferably less than 5 minutes. The rapid spin up and shorter time to engage enables beneficial use of the CMG 10 even for short trip times, which makes up a majority of boating trips. Thus, the rapid spin-up enables the CMG 10 to be used on a greater number of boating occasions.

Similarly, the spin down is in the order of minutes rather than hours compared to the current technology. Cooling systems with interleaved fins that rely on gaseous conduction and convection operate at a high temperature (e.g., 400° F.) and dissipate heat relatively slowly. In such systems, if the flywheel is stopped too fast, the heat may cause components to warp, which in turn may cause bearing life to be shortened. The bearing cooling systems 100 and/or motor cooling circuits 220 as herein described enables the CMG 10 to operate at a lower temperature (e.g., 200° F.) and be more efficient at removing heat. Consequently, the spin down time is cut from 3-4 hours to a few minutes (such as five to twenty minutes). This reduced running temperature as well as the rapid cooldown period prevents the well balanced rotating components from warping and thus the spin down time can be reduced. The short spin down time also eliminates the annoying hum and vibration from the spinning flywheel sooner and allows enjoyment of the peace and serenity after returning from a day of boating to begin sooner.

The bearing cooling systems 100 and/or motor cooling circuits 220 as herein described enable faster acceleration rates for the flywheel assembly 40, which translates to a lower time to engage the CMG 10. The lower time to engage in turn will enable beneficial use of the CMG 10 even on trips of short duration. The bearing cooling systems and/or motor cooling circuits 220 also enable fast spin down times so that the quiet enjoyment of the boat is not disturbed by the noise emanating from the flywheel assembly 40 as it winds down.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

The disclosure of U.S. Provisional Patent Application No. 63/070,494, filed 26 Aug. 2020 and entitled "Gyroscopic Boat Roll Stabilizer with Motor Cooling," is incorporated herein by reference in its entirety.

What is claimed is:

1. A gyroscopic roll stabilizer for a boat, comprising:
an enclosure mounted to a gimbal for rotation about a gimbal axis and configured to maintain a below-ambient pressure;
a flywheel assembly including a flywheel and flywheel shaft; the flywheel assembly rotatably mounted inside the enclosure for rotation about a flywheel axis;
a motor operative to rotate the flywheel assembly and disposed inside the enclosure;
a motor cooling circuit configured to transfer heat away from the motor; the motor cooling circuit having a closed fluid pathway for recirculating cooling fluid therein;
wherein the fluid pathway includes a fluid channel jointly defined by the motor and the enclosure and having the cooling fluid therein;
wherein the gyroscopic roll stabilizer is configured to transfer heat away from the motor to the cooling fluid.

2. The gyroscopic roll stabilizer of claim 1:
wherein the flywheel assembly is configured to precess relative to the gimbal axis, when unlocked, in response to roll of the boat;
wherein the motor is configured to accelerate the flywheel assembly to a normal operating speed;
wherein the gyroscopic roll stabilizer is configured to lock the flywheel assembly at the start of acceleration and to unlock the flywheel assembly not later than when the speed of the flywheel assembly reaches 75% of its normal operating speed.

3. The gyroscopic roll stabilizer of claim 2, wherein the gyroscopic roll stabilizer is configured such that a time, from the start of acceleration of the flywheel assembly until the unlocking of the flywheel assembly to allow precession, is less than 20 minutes.

4. The gyroscopic roll stabilizer of claim 3, wherein the gyroscopic roll stabilizer is configured such that the time, from the start of acceleration of the flywheel assembly until the unlocking of the flywheel assembly to allow precession, is less than 10 minutes.

5. The gyroscopic roll stabilizer of claim 3, wherein the gyroscopic roll stabilizer is configured such that the time, from the start of acceleration of the flywheel assembly until the unlocking of the flywheel assembly to allow precession, is less than 5 minutes.

6. The gyroscopic roll stabilizer of claim 1:
wherein the motor cooling circuit further comprises:
a reservoir for the cooling fluid;

a fluid pump operatively connected to the fluid channel and configured to recirculate the cooling fluid through the fluid channel to remove heat from the motor;

wherein the fluid pathway for the cooling fluid extends through the fluid reservoir and the fluid channel; and further comprising a heat exchanger operatively connected to the closed fluid pathway and configured to remove heat from the cooling fluid to ambient after the cooling fluid has passed through the fluid channel.

7. The gyroscopic roll stabilizer of claim 1, wherein the cooling fluid comprises glycol.

8. The gyroscopic roll stabilizer of claim 1, wherein the motor cooling circuit is configured such that the cooling fluid flows through the fluid channel helically about the flywheel.

9. A method of operating a gyroscopic roll stabilizer for a boat, comprising:

maintaining a below ambient pressure within an enclosure surrounding a flywheel assembly, the flywheel assembly including a flywheel and a flywheel shaft;

spinning the flywheel assembly about a flywheel axis via a motor mounted internal to the enclosure;

dissipating heat from the motor by transferring the heat by conduction and convection to a cooling fluid flowing through a fluid channel jointly defined by the motor and the enclosure;

cooling the cooling fluid by removing heat from the cooling fluid external to the portion of the enclosure maintained at the below-ambient pressure; and recirculating the cooling fluid through a closed fluid pathway that includes the fluid channel.

10. The method of claim 9, wherein the method comprises:

accelerating the flywheel assembly to a normal operating speed;

locking, during the accelerating, the flywheel assembly against precession;

not later than when the flywheel assembly reaches a speed of at least 75% of the normal operating speed, unlocking the flywheel assembly to allow precession of the flywheel assembly and dampening roll of the boat via the precession of the flywheel assembly.

11. The method of claim 10, wherein a time, from the start of the accelerating until the unlocking of the flywheel assembly to allow precession, is not more than 20 minutes.

12. The method of claim 10, wherein the time, from the start of the accelerating until the unlocking of the flywheel assembly to allow precession, is not more than 10 minutes.

13. The method of claim 10, wherein the time, from the start of the accelerating until the unlocking of the flywheel assembly to allow precession, is not more than 5 minutes.

14. The method of claim 9:

wherein the recirculating comprises:

routing the cooling fluid from the fluid channel to a reservoir;

pumping the cooling fluid from the reservoir to the fluid channel;

wherein the fluid pathway for the cooling fluid extends through the fluid reservoir and the fluid channel; and wherein the cooling the cooling fluid comprises cooling the cooling fluid via a heat exchanger disposed external to the enclosure.

15. The method of claim 9, wherein the cooling fluid comprises glycol.

16. The method of claim 9, wherein the cooling fluid flows through the fluid channel helically about the flywheel.

17. The method of claim 10, wherein the normal operating speed is about nine thousand rpm.

18. The gyroscopic roll stabilizer of claim 2, wherein the normal operating speed is about nine thousand rpm.

* * * * *